United States Patent [19]

Endo et al.

[11] Patent Number: 5,604,163
[45] Date of Patent: Feb. 18, 1997

[54] SYNTHETIC SILICA GLASS POWDER

[75] Inventors: Hozumi Endo; Kazumi Kimura; Akira Utsunomiya, all of Kitakyushu, Japan

[73] Assignee: Mitsubishi Chemical Corporation, Tokyo, Japan

[21] Appl. No.: 500,202

[22] Filed: Jul. 10, 1995

[30] Foreign Application Priority Data

Jul. 11, 1994 [JP] Japan .................................. 6-158755

[51] Int. Cl.$^6$ .................................................. C03C 3/06
[52] U.S. Cl. ............................................. 501/12; 501/54
[58] Field of Search ................................ 501/12, 54

[56] References Cited

U.S. PATENT DOCUMENTS

| | | | |
|---|---|---|---|
| 4,883,521 | 11/1989 | Shimizu et al. | 501/12 |
| 4,979,973 | 12/1990 | Takita et al. | 501/12 |
| 5,063,181 | 11/1991 | Takita et al. | 501/12 |
| 5,114,881 | 5/1992 | Kaneko et al. | 501/12 |
| 5,141,786 | 8/1992 | Shimizu et al. | 501/54 |
| 5,211,733 | 5/1993 | Fukao et al. | 501/12 |
| 5,302,556 | 4/1994 | Shimizu et al. | 501/54 |

FOREIGN PATENT DOCUMENTS

| | | |
|---|---|---|
| 0384284 | 8/1990 | European Pat. Off. . |
| 0385753 | 9/1990 | European Pat. Off. . |

OTHER PUBLICATIONS

Database WPI, Derwent Publications, AN-89 320713, JP-A-01 239082, Sep. 25, 1989.
Database WPI, Derwent Publications, AN-78 81142a, JP-A-53 113817, Oct. 4, 1978.

*Primary Examiner*—Mark L. Bell
*Assistant Examiner*—Louis M. Troilo
*Attorney, Agent, or Firm*—Oblon, Spivak, McClelland, Maier & Neustadt, P.C.

[57] ABSTRACT

A synthetic silica glass powder obtained by calcining a silica gel powder obtained by hydrolysis of a tetraalkoxysilane, said synthetic silica glass powder containing from $1 \times 10^{-1}$ to $1 \times 10^{-4}$ ppm of boron and having an internal silanol group concentration of at most 150 ppm and an isolated silanol group concentration of at most 5 ppm.

7 Claims, No Drawings

SYNTHETIC SILICA GLASS POWDER

The present invention relates to a synthetic silica glass powder which is useful as a starting material for a very high purity silica glass product which is useful in the fields of producing semiconductors and optical fibers, particularly for use at a high temperature region of at least 1000° C. and which undergoes no substantial bubbling during the fusing operation.

In recent years, jigs or crucibles made of various glasses used in the industry of optical fibers or semiconductors, are under very severe controls with respect to the purity of the constituting glass materials, along with the high integration of semiconductors.

As a method for producing a highly pure glass product to be used for such applications, a method has heretofore been known wherein an alkoxysilane is used as a starting material, and such an alkoxysilane is hydrolyzed and subjected to a sol-gel method to obtain a silica powder, and then the silica powder is calcined to obtain a glass powder, which is then melted for vitrification to obtain the desired glass product. According to this method, the alkoxysilane as the starting material can readily be purified by distillation, whereby a glass product of high purity can be obtained.

However, by this method, silanol groups which the starting material has during the hydrolysis and gelation, will remain as residual silanol groups in the particles after the calcination, whereby, as compared with natural quartz sand, the product has a higher silanol content. If the silanol content is high, the viscosity at a high temperature tends to be low, and such a product is not useful for e.g. a diffusion furnace for semiconductors or for a crucible for drawing a silicon single crystal (Japanese Unexamined Patent Publication No. 320232/1989). For such applications, it is desired that the silanol content is at most 100 ppm, preferably at most 50 ppm. To lower the silanol concentration, a method for producing a low silanol silica has been proposed (Japanese Unexamined Patent Publication No. 289416/1990) which comprises a first step of removing the majority of internal silanol groups (infrared absorption wavelength: about 3670 $cm^{-1}$) at a temperature of from 600° to 1000° C. in an atmosphere with a low steam partial pressure, and a second step of removing isolated silanol (freely vibrating hydroxyl groups on the surface) groups (infrared absorption wavelength: about 3740 $cm^{-1}$) at a temperature of at least 1200° C.

With respect to silica glass parts to be used for optical fibers or semiconductors, presence of bubbles will be problematic in addition to the requirement for the strength at high temperature. Namely, if bubbles are present, in the case of e.g. a crucible for withdrawing a silicon single crystal, the bubbles are likely to break on the inner surface of the crucible during drawing of the single crystal, whereby defects will be caused by unstable surface of molten silicon, and the yield will be low. Further, when heated, the bubbles tend to expand, thus leading to a problem also in the dimensional stability. On the other hand, in the case of optical fibers, problems such as attenuation of the optical information or breakage of the optical fibers during the manufacturing are likely to result due to the presence of bubbles. As a cause for formation of bubbles during the fusion a silica glass powder, it is known that if the silanol concentration is too high (more than from 50 to 100 ppm), steam gas is likely to form and consequently bubbles are likely to form. Further, it is known that if fine powder is present in a substantial amount in the silica glass, such a fine powder will melt prior to large particles during the fusing operation, to form closed pores which undergo bubbling (Japanese Unexamined Patent Publication No. 24970/1993).

However, it has been found that even when the silanol content is not higher than 100 ppm, bubblings sometimes takes place. Therefore, it has been a problem how to obtain a synthetic silica glass powder which is free from bubbling during the fusion.

The present inventors have conducted an extensive research to solve the above problem and as a result, have found that bubbling during the fusion will be little when the contents of morphologically different two silanols (internal silanol group and isolated silanol group) are within certain specified ranges in a silica glass powder containing a certain specific amount of boron. The present invention has been accomplished on the basis of this discovery.

That is, the present invention provides a synthetic silica glass powder obtained by calcining a silica gel powder obtained by hydrolysis of a tetraalkoxysilane, said synthetic silica glass powder containing from $1\times10^{-1}$ to $1\times10^{-4}$ ppm of boron and having an internal silanol group concentration of at most 150 ppm and an isolated silanol group concentration of at most 5 ppm.

Now, the present invention will be described in detail with reference to the preferred embodiments.

The synthetic silica glass powder as an object of the present invention is a silica glass powder obtained by drying and calcining a silica gel obtained by hydrolysis of an alkoxysilane.

The hydrolysis of an alkoxysilane by a sol-gel method is carried out by reacting an alkoxysilane with water in accordance with a well-known method. The alkoxysilane to be used as the starting material is preferably a $C_{1-4}$ lower alkoxysilane such as tetramethoxysilane or tetraethoxysilane, or its oligomer. Further, to this alkoxysilane, boron is incorporated in an amount of from $1\times10^{-1}$ to $1\times10^{-4}$ ppm, preferably from $5\times10^{-2}$ to $1\times10^{-4}$ ppm, based on the final synthetic silica glass powder. In a case where boron is present excessively in metal silicon as the raw material for an alkoxysilane, the boron concentration can be controlled to be within the above range by removing boron by controlling the distillation and purification conditions for the alkoxysilane. On the other hand, in a case where the content of boron is less than the above range, the boron concentration may be adjusted by adding e.g. an alkoxide of boron.

The amount of boron contained in the synthetic silica glass powder can readily be measured, for example, by ICP-MS.

The amount of water to be used is selected usually within a range of from 1 to 10 equivalent to the alkoxy group in the alkoxysilane. At that time, an organic solvent missible with water, such as an alcohol or an ether, may be mixed to water, as the case requires. A typical example of the alcohol to be used may be a lower aliphatic alcohol such as methanol or ethanol. By use of such an organic solvent, the reaction system can be made uniform and stable. However, as the hydrolysis proceeds, the alkoxy group bonded to the alkoxysilane produces alcohol as a result of the hydrolysis. Therefore, if the reaction solution before gelation is uniform, the reaction can be carried out practically without any trouble even if no alcohol is added.

For the hydrolysis reaction, an acid such as hydrochloric acid or acetic acid, or an alkali such as ammonia, may be employed as a catalyst. As a matter of course, in order to obtain a silica gel powder of high purity, it is necessary that materials to be introduced to this reaction system, such as the starting material alkoxysilane, water, the catalyst, etc., are all of high purity.

Gelation of the hydrolyzate can be facilitated by heating. However, the hydrolyzate will be geled in a few hours even when left at room temperature. Therefore, the time for gelation can be adjusted by controlling the degree of heating. The obtained gel may be dried after pulverization, or may be pulverized after drying. The average particle size of the dried silica gel is usually from 50 to 1000 μm, preferably from 90 to 600 μm.

The gel is dried to such an extent that the content of $H_2O$ is usually from 1 to 30 wt %. Drying is carried out usually by heating the gel at a temperature of from 100° to 200° C. under vacuum or in an inert gas atmosphere.

The dried silica gel powder thus prepared is further calcined usually for from 10 to 30 hours by changing the temperature within a range of from 700° C. to 1200° C. to obtain a synthetic silica glass powder.

By controlling the calcination conditions (the calcination temperature, the calcination atmosphere, etc.), it is possible to adjust the internal silanol and the isolated silanol contained in the synthetic silica glass powder.

The respective contents of the internal silanol and the isolated silanol can readily be measured as relative values by infrared spectra.

Thus, the synthetic silica glass powder of the present invention is adjusted so that the internal silanol would be at most 150 ppm, and the isolated silanol would be at most 5 ppm. Even if the internal silanol is higher than the conventional value (higher than 100 ppm), so long as the isolated silanol is at most 5 ppm, formation of bubbles can remarkably be reduced. To further reduce formation of bubbles, it is preferred to control the above-mentioned isolated silanol to a level within a range of from about 0.05 to 2 ppm. Further, the internal silanol is preferably at most 140 ppm, more preferably within a range of from 5 to 80 ppm. If the respective silanols are more than the above upper limits, the possibility of formation of bubbles increases. On the other hand, in order to obtain a synthetic silica glass powder having the respective values lower than the above lower limits, it will be required to conduct the calcination for an extremely long period of time and to maintain a strictly controlled calcination atmosphere, which may be very difficult, and even then, it is not possible to increase the effect of reducing bubbles.

The synthetic silica glass powder thus obtained has a merit that formation of bubbles during the fusion is little, and it can be suitably used as a starting material for a very high purity silica glass product, which is free from formation of bubbles, such as a crucible for withdrawing a silicon single crystal, or a tube or jig for a diffusion furnace for manufacturing semiconductors.

Now, the present invention will be described in further detail with reference to Examples. However, it should be understood that the present invention is by no means restricted to such specific Examples.

EXAMPLE 1

Into an agitation tank, tetramethoxysilane selected so that the boron content of the resulting synthetic silica glass powder would be $2\times10^{-2}$ ppm, and water in an amount corresponding to five times in equivalent to the tetramethoxysilane, were charged and stirred for one hour at a temperature of 30° C. for hydrolysis to obtain a uniform sol. This sol was transferred to a butt made of polyvinyl chloride and left to stand for 5 hours for gelation. The gel thereby obtained was dried for 12 hours at 140° C. by means of a vacuum drier, and then the particle size adjustment was carried out to a particle size of from 100 to 500 μm. 10 g of the dried silica gel powder thus obtained was charged into a cylindrical quartz container of 80 mmφ×60 mmH, which was then set in an electric furnace. Then, the temperature was raised to 1150° C. at a rate of 200° C./hr, and calcination was carried out at 1150° C. for 35 hours. After cooling naturally, the infrared spectrum was measured by means of IR-810 Model Infrared Spectrometer, manufactured by Nippon Bunko K.K. (liquid cell method employing carbon tetrachloride), whereby the concentration of the internal silanol having an absorption in the vicinity of 3670 $cm^{-1}$ was 52 ppm, and the concentration of the isolated silanol group having an absorption in the vicinity of 3740 $cm^{-1}$ was 3 ppm. Here, calculation was carried out by using 58 l/mol.cm as the absorption coefficient. This absorption coefficient is the one for the internal silanol. With respect to the isolated silanol, the absorption coefficient is unknown, and therefore, on the assumption that it is the same as the absorption coefficient for the internal silanol, the isolated silanol concentration was determined by taking the ratio of the peak area of the isolated silanol to the peak area of the internal silanol. Further, 20 g of this synthetic silica glass powder was dissolved in hydrofluoric acid, and the solution was adjusted, whereupon the boron concentration was measured by ICP-MS and found to be $2\times10^{-2}$ ppm. Further, this synthetic silica glass powder was formed into an ingot of 12 mmφ×60 mmH, by means of a Verneuil's method fusing apparatus by oxygen-hydrogen flame, whereby only three very tiny bubbles were visually observed.

EXAMPLE 2

A dried silica gel powder was prepared in the same manner as in Example 1, and 100 g of the powder was charged into a cylindrical quartz container of 80 mmφ×60 mmH, which was then set into an electric furnace. Then, the temperature was raised to 1200° C. at a rate of 200° C./hr, and calcination was carried out at 1200° C. for 15 hours. After cooling naturally, the concentrations of the internal silanol, the isolated silanol and boron were measured in the same manner as in Example 1. The results are shown in Table 1. Further, an ingot of 12 mmφ×60 mmH was prepared by the Verneuil's method, whereby no bubble was visually observed.

COMPARATIVE EXAMPLE 1

A dried silica gel powder was prepared in the same manner as in Example 1 except that as the starting material, tetramethoxysilane prepared under a distillation and purification condition different from Example 1 was used, and 100 g of the powder was charged into a cylindrical quartz container of 80 mmφ×60 mmH, which was set in an electric furnace. Then, the temperature was raised to 1100° C. at a rate of 200° C./hr, and calcination was carried out at 1100° C. for 55 hours. After cooling naturally, the concentrations of the internal silanol, the isolated silanol and boron were measured in the same manner as in Example 1. The results are shown in Table 1. Further, an ingot of 12 mmφ×60 mmH was prepared by the Verneuil's method, whereby many bubbles formed.

COMPARATIVE EXAMPLE 2

A dried silica gel powder was prepared in the same manner as in Example 1 except that as the starting material, tetramethoxysilane prepared under a distillation and purification condition different from Example 1, was used, and 100 g of the powder was charged into a cylindrical quartz container of 80 mmφ×60 mmH, which was set in an electric furnace. Then, the temperature was raised to 1200° C. at a rate of 200° C./hr, and calcination was carried out at 1200° C. for 2 hours. After cooling naturally, the concentrations of the internal silanol, the isolated silanol and boron were measured in the same manner as in Example 1. The results are shown in Table 1. Further, an ingot of 12 mmφ×60 mmH was prepared by the Verneuil's method, whereby many bubbles formed.

TABLE 1

|  | Internal silanol (ppm) | Isolated silanol (ppm) | Boron (ppm) |
| --- | --- | --- | --- |
| Example 1 | 52 | 3 | $2 \times 10^{-2}$ |
| Example 2 | 130 | Not detected (lower than the lower limit of 0.5 ppm) | $2 \times 10^{-2}$ |
| Comparative Example 1 | 58 | 8 | $3 \times 10^{-1}$ |
| Comparative Example 2 | 480 | 2 | $4 \times 10^{-1}$ |

As described in the foregoing, according to the present invention, it is possible to obtain a synthetic silica glass powder with few bubbles.

We claim:

1. A synthetic silica glass powder obtained by calcining a silica gel powder obtained by hydrolysis of a tetraalkoxysilane, said synthetic silica glass powder consisting essentially of silica glass and from $1 \times 10^{-1}$ to $1 \times 10^{-4}$ ppm of boron and having an internal silanol group concentration of at most 150 ppm and an isolated silanol group concentration of at most 5 ppm.

2. The synthetic silica glass powder according to claim 1, wherein the tetraalkoxysilane is a $C_{1-4}$ alkoxysilane or its oligomer.

3. The synthetic silica glass powder according to claim 1, wherein the content of boron is from $5 \times 10^{-2}$ to $1 \times 10^{-4}$ ppm.

4. The synthetic silica glass powder according to claim 1, wherein the silica gel powder is a dried silica gel powder having an average particle size of from 50 to 1000 μm.

5. The synthetic silica glass powder according to claim 1, wherein the isolated silanol group concentration is within a range of from 0.05 to 2 ppm.

6. The synthetic silica glass powder according to claim 1, wherein the internal silanol group concentration is within a range of from 5 to 80 ppm.

7. A synthetic silica glass powder wherein said silica glass powder obtained by calcining a silica gel powder obtained by hydrolysis of a tetraalkoxysilane, said synthetic silica glass powder consists of silica glass and $1 \times 10^{-1}$ to $1 \times 10^{-4}$ ppm of boron and having an internal silanol group concentration of at most 150 ppm and an isolated silanol group concentration of at most 5 ppm.

\* \* \* \* \*